United States Patent
Brookey et al.

[11] Patent Number: 6,148,917
[45] Date of Patent: *Nov. 21, 2000

[54] METHOD OF RELEASING STUCK PIPE OR TOOLS AND SPOTTING FLUIDS THEREFOR

[75] Inventors: Tommy F. Brookey, Edmond, Okla.; Jack C. Cowan, Lafayette, La.

[73] Assignee: ActiSystems, Inc., Edmond, Okla.

[*] Notice: This patent is subject to a terminal disclaimer.

[21] Appl. No.: 09/246,934

[22] Filed: Feb. 9, 1999

Related U.S. Application Data

[63] Continuation-in-part of application No. 08/800,727, filed as application No. PCT/US98/02566, Feb. 10, 1998, Pat. No. 5,881,826, and a continuation-in-part of application No. 09/121,713, Jul. 24, 1998.

[51] Int. Cl.[7] ............................... C09K 7/02; C09K 7/06; E21B 31/00; E21B 31/03
[52] U.S. Cl. ............................ 166/301; 175/69; 507/102; 507/202; 507/910; 507/940
[58] Field of Search ............................ 166/301; 175/65, 175/69; 507/102, 202, 910, 940

[56] References Cited

U.S. PATENT DOCUMENTS

| | | | |
|---|---|---|---|
| 2,808,887 | 10/1957 | Erwin | 166/301 |
| 3,246,696 | 4/1966 | Fox, Jr. | 166/301 |
| 3,328,295 | 6/1967 | Lummus et al. | 166/301 X |
| 4,464,269 | 8/1984 | Walker et al. | 166/301 X |
| 4,614,235 | 9/1986 | Keener et al. | 166/301 |
| 5,127,475 | 7/1992 | Hayes et al. | 166/301 |
| 5,141,920 | 8/1992 | Bland et al. | 166/301 X |
| 5,716,910 | 2/1998 | Totten et al. | 507/102 |
| 5,881,826 | 3/1999 | Brookey | 507/102 X |
| 5,977,030 | 11/1999 | House | 507/110 |

*Primary Examiner*—George Suchfield
*Attorney, Agent, or Firm*—Roy F. House

[57] ABSTRACT

Aphron-containing spotting fluids and their use in releasing pipe or tools stuck in the filter cake on the sides of a borehole are disclosed. The spotting fluids comprise a liquid, either aqueous, oleaginous, or mixtures thereof, a viscosifier which imparts a low shear rate viscosity to the fluids of at least 10,000 centipoise, an aphron-generating surfactant, and aphrons. The spotting fluids are used in a conventional method of releasing pipes or tools stuck in the filter cake on the sides of a borehole during conventional drilling or well servicing operations.

9 Claims, No Drawings

METHOD OF RELEASING STUCK PIPE OR TOOLS AND SPOTTING FLUIDS THEREFOR

The patent application is a continuation-in-part application of U.S. patent application Ser. No. 08/800,727 filed Feb. 13, 1997, now U.S. Pat. No. 5,881,826 of P.C.T. International Application No. PCT/US98/02566 filed Feb. 10, 1998, and of U.S. Pat. application Ser. No. 09/121,713 filed Jul. 24, 1998; to each of which priority is claimed herein.

BACKGROUND OF THE INVENTION

There are disclosed in co-pending patent application Ser. No. 08/800,727 filed Feb. 13, 1997, incorporated herein by reference, co-pending PCT patent application Ser. No. PCT/US98/02566 filed Feb. 10, 1998, incorporated herein by reference, and co-pending patent application Ser. No. 09/121,713 filed Jul. 24, 1998, incorporated herein by reference, well drilling and servicing fluids which exhibit a high low shear rate viscosity (hereinafter often referred to as "LSRV") and which contain aphrons (i.e., microbubbles of a gas). The preferred fluids have the aphrons generated by imbibing air contacted by the fluids and creating the aphrons due to the pressure drop which occurs when the flowing fluid exits the drill bit. However inert gases such as nitrogen and carbon dioxide can be incorporated into the fluids rather than relying on imbibed air or can be generated in-situ by reactive components such as carbonates and acids. Moreover, the aphrons can be generated at the surface of the well and incorporated into the fluid or the aphrons can be created at the surface in the fluid.

This invention relates to a method and composition for facilitating the release of a stuck pipe or tool within a borehole, preferably a differentially stuck pipe.

PRIOR ART

Stuck pipe or tool may be defined as drill pipe, drill collars, drill bits, stabilizers, reamers, casing, tubing, measurement while drilling tools, logging tools, etc., having inadvertently become immovable in a wellbore. The term "stuck pipe" is used in the industry as a convenient compendious term to cover the sticking of all such equipment and is generally understood as not being restricted literally to pipes. Sticking may occur when drilling is in progress, when pipe and casing is being run in the hole or when a drill pipe is being hoisted.

There are numerous causes of stuck pipe: some occur regularly, some may be peculiar to a particular area and some may be unique. Industry convention categorizes the causes as either differential or mechanical sticking.

Differential sticking is believed to occur by the following mechanism. During most drilling operations, the hydrostatic pressure exerted by a drilling mud column is greater than the formation fluid pressure. In permeable formations, mud filtrate flows from the hole into the rock and builds up a filter cake. A pressure differential exists across the filter cake which is equal to the difference between the pressure of the mud column and the pressure of the formation.

When a pipe is central to the bore, the hydrostatic pressure due to the mud overbalance acts in all directions around it. If, however, the pipe touches the filter cake, the mud overbalance acts to push the pipe further into the cake, thus increasing the contact area between the pipe and the cake. Filtrate is still expelled from the filter cake between the pipe and the formation, thus shrinking the cake and allowing the pipe to penetrate further into it and so increasing the contact area still more. If the pressure difference is high enough and acts over a sufficiently large area, the pipe may become stuck.

Differential sticking usually occurs when the pipe has been motionless for a period of time, e.g., when making a connection or during surveying. Differential sticking can be a particular problem when drilling depleted reservoirs because of the associated high overbalance.

The force required to pull differentially stuck pipe free depends, inter alia, upon the following factors:

a. The difference in pressure between the borehole and the formation. Any overbalance adds to side forces which may exist due to the deviation of the hole.

b. The surface area of pipe embedded in the wall cake. The thicker the cake or the larger the pipe diameter, the greater this area is likely to be.

c. The bond developed between the pipe and the wall cake is a very significant factor, being directly proportional to the sticking force. This can include frictional, cohesive and adhesive forces. It tends to increase with time, making it harder to pull the pipe free.

Differential sticking may be distinguished from other forms of sticking, such as mechanical sticking. Mud circulation is not interrupted as there is no obstruction in the hole to stop the flow, as would be the case for pipe stuck due to hole bridging or caving. It is not possible to move or rotate the pipe in any direction.

When a pipe sticks the driller usually tries to free it by mechanical movement, i.e., by pulling, jarring, torquing, or, if the pipe was moving immediately prior to sticking, trying to move it in the opposite direction. Frequently this fails to release the pipe and there is, of course, a limit to the force which can be applied, since too much force could fracture the pipe and make the situation worse.

If the pipe remains stuck it is then sometimes the practice to apply a pipe release agent, i.e., a spotting fluid.

Spotting fluids are chemically active mixtures, which may be oil based or water based, including emulsions, which are placed over the stuck region in an attempt to free the pipe if working the pipe has failed to release it. These are believed to act by attacking the mud filter cake. They are positioned by pumping them down the hole to the stuck region in the form of a slug, known as a pill. The pill generally contains sufficient material to cover the stuck zone and extend slightly beyond it over a total area of 1.5 times the area of the stuck zone. The pill volume necessary to achieve this is usually about 100 bbl. Pills frequently are left to soak until the pipe is free or attempts to free the pipe are abandoned. However, it is also common to run smaller or larger pills and to run two or more pills, one behind the other after waiting for a soak period between pills, and to move the pill past the stuck zone a little at a time by pumping.

Spotting fluids are generally sold as proprietary blends by companies trading in this area, frequently without divulging their chemical components. However, some spotting fluids are based on asphaltenic compounds and some on glycols, glycerols, alcohols and fatty acids and derivatives of such compounds. Traditionally, pill density has been increased in a similar manner to muds, using solid particulate weighting agents such as barite, with viscosifiers to prevent settling, to preferably match the density of the spotting fluid to the density of the drilling fluid which had been used up to the time of the pipe. being stuck. For example, if the drilling fluid had a density of 14 pounds/gal (ppg), then the spotting fluid would be weighted up, for example, with barite, to result in a spotting fluid density of 14 ppg. However, density matching is not always considered necessary nor is this always the best procedure.

There are many such spotting fluids known in the prior art. In those cases where environmental concerns do not prohibit or discourage their use, diesel oil has been used with a fair amount of success.

For many years, asphalt-based spotting fluids such as the products BLACK MAGIC SFT™ and BLACK MAGIC™ marketed by Baker-Hughes were also used with a fair amount of success. In those cases where asphalt, diesel oil, mineral oil or other oil-based spotting fluids cannot or should not be used, many other commercially available, environmentally-friendly spotting fluids have been used in an attempt to free stuck pipe, oftentimes, only with limited success.

For example, the use of polyalphaolefin as a lubricant/spotting fluid is disclosed in David O. Trahan, et al. U.S. Pat. No. 4,876,017, such material being marketed by The Coastal Mud Company under the trade name COASTALUBE™.

James R. Hayes, et al., U.S. Pat. No. 5,002,672 is another example of a spotting fluid (marketed by Turbo-Chem International, Inc. of Lafayette, La.) comprising the use of a glycerophosphoric acid ester and a polyacyloxy polycarboxylic acid ester of mono and/or diglycerides, in combination with other viscosifiers and sealing agents.

Heinz Mueller, et al. U.S. Pat. No. 4,964,615 discloses yet another spotting fluid using acid alkyl esters or mixtures of esters.

Halliday et al. U.S. Pat. No. 5,608,879 discloses using olefin isomers containing at least one double bond located internally within the hydrocarbon as a spotting fluid additive.

Patel et al. U.S. Statutory Invention Registration No. H1000 discloses using synthetic hydrocarbons comprising branched chain oligomers synthesized from one or more olefins containing a $C_2$ to $C_{14}$ chain length wherein the oligomers have an average molecular weight of from 120 to 1000.

Many other commercially available spotting fluids are known in the art such as, for example, the COASTALSPOT spotting fluid (a polyol ester) marketed by the Coastal Mud Company, Abbeville, La., the ENVIRO-SPOT™, the PETROFREE™ Ester and the BARO-SPOT™ spotting fluids marketing by Baroid Drilling Fluids, Inc. of Houston, Tex., the CESCO A-25 SPOT™ product marketed by Cesco Chemicals, Inc. of Lafayette, La., the PIPE-LAX™ product (a glyceride) marketed by M-I Drilling Fluids, Inc., and the VL-250 product (a blend of terpenes-cyclic $C_{10}$) marketed by Integrity Industries. The ENVIRO-SPOT™ product is a blend of emulsifiers, lubricants, gellants and other materials. The BARO-SPOT™ product is a blend of surfactants, lubricants and viscosifiers. SURFYNOL™ 440, a $C_{14}$ Acetylene Polyol, is marketed by Air Products, Inc. BXR-2000 is a polyglycol marketed by Baroid Drilling Fluids, Inc. MONA™ 939 is a phosphate ester marketed by Mona Industries, Inc.

It is also known (the KOPLUS LL™ material marketed by Gait International of Dublin, Ireland) to use citric acid in combination with organic or inorganic salts (including potassium chloride) to free stuck pipe.

However, each of the available spotting fluids has had only limited success in freeing stuck pipe.

SUMMARY OF THE INVENTION

We have found that pipe and tools stuck in a borehole can be released using as a spotting fluid a liquid having incorporated therein one or more viscosifiers that impart a low shear rate viscosity of at least about 10,000 centipoise to the fluid, an aphron-generating surfactant, and aphrons, the aphrons preferably being generated at the surface before placement of the spotting fluid at the location of the stuck pipe or tool.

The method of releasing the stuck pipe or tool comprises locating the point at which the pipe or tool is stuck against the formation penetrated by the borehole, and introducing a volume of the spotting fluid to the depth of the point of the stuck pipe or tool wherein the volume of the spotting fluid is sufficient to displace the fluid in the borehole over the entire stuck area.

Thus, it is an object of the invention to incorporate aphrons into spotting fluids to improve the performance thereof.

It is another object of the invention to prepare spotting fluids having a low shear rate viscosity of at least about 10,000 centipoise and containing aphrons therein.

It is still another object of the invention to provide a method of releasing a stuck pipe or tool within a borehole wherein the novel spotting fluid of this invention is spotted at the location in the borehole at which the pipe or tool is stuck.

These and other objects of the invention will be apparent to one skilled in the art upon reading the specification and claims hereof.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

PREFERRED EMBODIMENTS OF THE INVENTION

In its broadest aspects, the present invention is directed to the incorporation of Aphrons into spotting fluids used to release pipe and tools stuck in a borehole. The base spotting fluid may be a spotting fluid known in the art as exemplified by the patents and fluids set forth hereinbefore, or it may be a freshly prepared spotting fluid having the characteristics desired. Stable aphron-containing spotting fluids are obtained by increasing the low shear rate viscosity (LSRV) of the spotting fluid to at least 10,000 centipoise, preferably at least 20,000 centipoise, and most preferably to at least 40,000 centipoise. Since the stability of the aphrons is enhanced as the LSRV increases, a LSRV of several hundred thousand may be desired.

The aphrons are obtained by incorporating (1) an aphron-generating surfactant into the spotting fluid and thereafter generating the aphrons in the spotting fluid or (2) generating the aphrons in a liquid compatible with the spotting fluid and mixing the apbron-containing fluid with the spotting fluid.

The book by Felix Sebba entitled "Foams and Biliquid Foams—Aphrons", John Wiley & Sons, 1987, incorporated herein by reference, is an excellent source on the preparation and properties of aphrons, i.e., microbubbles. An aphron is made up of a core which is often spherical of an internal phase, usually gas, encapsulated in a thin shell. This shell contains surfactant molecules so positioned that they produce an effective barrier against coalescence with adjacent aphrons.

The aphrons can be generated by means known in the art. In addition to the methods disclosed by Felix Sebba in his book referenced previously, methods are disclosed in Michelsen et al. U.S. Pat. No. 5,314,644, incorporated herein by reference, Yoon et al. U.S. Pat. No. 5,397,001, incorporated herein by reference, Kolaini U.S. Pat. No. 5,783,118, incorporated hereby by reference, Wheatley et al. U.S. Pat. No. 5,352,436, incorporated herein by reference, and U.S. Pat. Nos. 4,162,970; 4,112,025; 4,717,515; 4,304,740; and 3,671,022, each incorporated herein by reference.

Aphrons will be produced by the pressure drop as the spotting fluid is pumped through the drill bit.

The gas used to create the aphrons may be any gas which is not appreciably soluble in the liquid phase of the fluid. Thus the gas may be air, nitrogen, carbon dioxide, organic gases, and the like, including air encapsulated in the fluid during mixing.

The spotting fluid comprises a liquid having incorporated therein a viscosifier such that the spotting fluid has a LSRV of at least 10,000 centipoise, an aphron generating surfactant, and aphrons, and optionally, a release agent. Any viscosifier which enhances the viscosity of the liquid phase surrounding the aphrons will enhance their stability; however, we have found that those viscosifiers which provide the elevated LSRV required of the present invention have the unique property of delaying coalescence of the aphrons for extremely long period of time.

None of the prior art disclose the use of aphrons (or microbubbles) in systems nder elevated pressures as in the present use. It is well known that the hydrostatic pressure of the fluid in a borehole increases as the depth increases. Thus although the size of the microbubbles is compressed, the elevated LSRV is believed to keep the aphrons from coalescing. In this regard, the aphrons can have a larger size at the surface of the well, as long as they are individual bubbles, since they will decrease in size to the aphron size range of less than about 100 micrometers as they are pumped down the borehole.

The spotting fluid may contain more than one liquid such as a liquid dispersed or emulsified into another base liquid in which it is relatively insoluble, such as water-in-oil dispersions or emulsions, oil-in-water dispersions or emulsions, and the like, where the "water" phase is an aqueous liquid or water soluble liquid and where the "oil" phase is a water insoluble liquid. The base liquid may be either an aqueous liquid or an oleaginous liquid. When the base liquid is an aqueous liquid, the spotting fluid will have a continuous aqueous phase. When the base liquid is an oleaginous liquid, the spotting fluid will have a continuous oleaginous phase.

The base aqueous liquid may be fresh water, sea water, or a brine containing soluble salts such as sodium chloride, potassium chloride, calcium chloride, magnesium chloride, sodium bromide, potassium bromide, calcium bromide, zinc bromide, sodium formate, potassium formate, cesium formate, and mixtures thereof. The brine may contain one or more soluble salts at any desired concentration up to saturation. Indeed, super saturated brines can be utilized where a solids free fluid is not desired or required.

The base oleaginous phase may be any organic, water insoluble liquid which can be viscosified to the desired extent and, when placed in a borehole at the location of a stuck pipe or tool, will cause the filter cake to crack or otherwise release the differential pressure to cause a release of the stuck pipe or tool. Exemplary oleaginous liquids include petroleum oils or fractions thereof, vegetable oils, and various synthetic organic liquids such as oligomers of unsaturated hydrocarbons, carboxylic acid esters, phosphoric acid esters, ethers, polyalkyleneglycols, diglymes, acetals, and the like.

The base liquid, both aqueous and non-aqueous, may contain other materials, either liquid or solid, which are soluble or insoluble therein.

Means are known in the art to enhance the low shear rate viscosity of liquids. Thus aqueous systems can be viscosified with certain polymers which produce a fluid exhibiting a high yield stress, shear thinning behavior. Particularly useful are biopolymers produced by the action of bacteria, fungi, or other microorganisms on a suitable substrate. Exemplary biopolymers are the polysaccharides produced by the action of *Xanthomonas compestris* bacteria which are known as xanthan gums. These are available commercially from several sources including: Kelco Oil Field Group, Inc., under the trademarks "Xanvis" and "Kelzan"; Rhone-Poulenc Chimie Fine, under the trademark "Rhodopol 23-p"; Pfizer Inc., under the trademark "Flocon 4800C"; Shell International Chemical Company of London, U.K., under the trademark "Shellflo ZA"; and Drilling Specialties Company, under the trademark "Flowzan." See for example U.S. Pat. No. 4,299,825 and U.S. Pat. No. 4,758,356, each incorporated herein by reference. Other biopolymers useful in the fluids of this invention are the so-called welan gums produced by fermentation with a microorganism of the genus Alcaligenes. See for example U.S. Pat. No. 4,342,866, incorporated herein by reference. Gellan gums are disclosed in U.S. Pat. No. 4,503,084, incorporated herein by reference. Schleroglucan polysaccharides produced by fungi of the genus sclerotium are disclosed in U.S. Pat. No. 3,301,848, incorporated herein by reference. Commercially available schleroglucan is sold under the trademarks "Polytran" from the Pillsbury Company and "Actigum CS-11" from CECA S.A. Succinoglycan polysaccharides are produced by cultivating a slime-forming species of Pseudomonas, Rhizobium, Alcaligenes or Agrobacterium, e.g., Pseudomonas sp. NCIB 11264, Pseudomonas sp. NCIB 11592 or *Agrobacterium radiobacter* NCIB 11883, or mutants thereof, as described in European Patent No. A40445 or A138255. Commercially available succinoglycan biopolymer is sold by Shell International Chemical Company of London, U.K., under the trademark "Shellflo-S".

Other water soluble polymers which impart shear thinning rheology to aqueous fluids include alginic acid derivatives, such as hydroxypropyl alginate, sodium alginate, sodium calcium alginate, ammonium calcium alginate, and the like. In-situ crosslinking of sodium alginate solutions with a divalent cation, such as with a calcium salt, produces elevated low shear rate viscosities.

The minimum concentration of the polymer required to increase the low shear rate viscosity of the fluid can be determined by routine testing. Thus the minimum concentration will be an amount sufficient to impart to the fluid the desired low shear rate viscosity. Generally the fluids will contain a concentration from about 1.4 kg/m$^3$ (0.5 ppb) to about 28.5 kg/m$^3$ (10 ppb), preferably from about 2.85 kg/m$^3$ (1.0 ppb) to about 14.3 kg/m$^3$ (5.0 ppb).

Certain aqueous liquids can be viscosified with a combination of a dispersed smectite clay, such as sodium bentonite, and a mixed metal hydroxide as set forth in U.S. Pat. Nos. 4,664,843 and 5,094,778. Indeed aqueous fluids can be obtained having an elevated LSRV by appropriately flocculating aqueous bentonitic clay dispersions or by incorporating 25 ppb or more non-beneficiated sodium bentonite therein.

Oleaginous liquids can be viscosified with various materials such as organophilic clays, colloidal fumed silicas, resins, polymers, dimer acids, fatty amine salts of anionic polysaccharides, fatty acid salts of cationic polysaccharides, and mixtures thereof as is known in the art. Oehler et al. U.S. Pat. No. 4,816,551 discloses an amide resin for use with organophilic clays to produce more shear thinning fluids.

The aphron-generating surfactant for use in the spotting fluids of this invention must be compatible with the base liquid and the viscosifier therein such that the LSRV of the fluid can be maintained. The surfactant may also have one or more stabilizers incorporated therein, such as alkyl alcohols, fatty alkanolamides, and allyl betaines. Generally the alkyl chain will contain from about 10 to about 18 carbon atoms. The aphron-generating surfactant may be anionic, non-ionic, or cationic depending on compatibility with the viscosifier. The annual publication "McCutcheon's Emulsifiers & Detergents", MC Publishing Co., McCutcheon Division, lists many surfactants and their manufacturers. Preferred anionic foaming surfactants are alkyl sulfates, alpha olefin sulfonates, alkyl (alcohol) ether sulfates, refined petroleum sulfonates, and mixtures thereof. Typically these surfactants will contain an alkyl chain having 8 to about 18 carbon atoms, preferably about 12 to about 16 carbon atoms. Preferred non-ionic surfactants are ethoxylated alcohols and amine oxides having an alkyl chain length of about 10 to about 18 carbon atoms, preferably from about 12 to about 16 carbon atoms. Fluorocarbon based surfactants are preferred for systems in which the oleaginous liquid is the continuous phase.

Representative commercially available surfactants are: (1) alkyl sulfates—DUPONOL™ Brand, Witco Corp; RHODAPON™ Brand, Rhone-Poulenc; STEOL™ Brand, Stepan Co.; (2) alpha olefin sulfonates—WITCONATE™ AOS and 3203, Witco Corp.; STEPANTAN™ AS-40, Stepan Co.; RHODACAL™ A-246/6, Rhone-Poulenc; (3) alkyl ether sulfates—WITCOLATE™ Brand, Witco Corp.; RHODAPLEX™ Brand, Rhone-Poulenc; SULFOCHEM™ Brand, Chernron Corp; (4) petroleum sulfonates—BASE™ Brand, Keil Chemical; MONALUBE™ 605, Mona Industries Inc.; WITCONATE™ NAS-8, Witco Corp.; (5) ethoxylated alcohols—ALFONIC™ Brand, Vista Chemical Co.; SURFONIC™ Brand, Huntsman Corp.; NEODOL™ Brand, Shell Chemical Co.; (6) amine oxides—AMMONYX™ Brand, Stepan Co.; RHODAMOX™ Brand, Rhone-Poulenc; CHEMOXIDE™ Brand, Chemron Corp; (7) betaines—CHEMBETAINE™ Brand, Chemron Corp.; REWOTERIC™ Brand, Witco Corp.; MIRATAINE™ Brand, Rhone-Poulenc; (8) fluorocarbon-based surfactants—FLUORAD™ Brand, 3M Co.; ZONYLT™ Brand, E.I. Dupont De Nemours & Co.; (9) fatty alkanolamides—ALKAMIDE™ Brand, Rhone-Poulenc; AMIDEX™ Brand, Chemron Corp; WITCAMIDE™ Brand, Witco Corp.

There is disclosed in Schutt et al. U.S. Pat. No. 5,639,443, incorporated herein by reference, that suitable surfactants for forming microbubbles include block copolymers of polyoxypropylene polyoxyethylene, sugar esters, fatty alcohols, aliphatic amine oxides, hyaluronic acid aliphatic esters, hyaluronic acid aliphatic ester salts, dodecyl poly (ethyleneoxy)ethanol, nonylphenoxy poly(ethyleneoxy) ethanol, hydroxy ethyl starch, hydroxyethyl starch fatty acid esters, dextrans, dextran fatty acid esters, sorbitol, sorbitol fatty acid esters, gelatin, serum albumins, phospholipids, polyoxyethylene fatty acid esters such as polyoxyethylene stearates, polyoxyethylene fatty alcohol ethers, polyoxyethylated sorbitan fatty acid esters, glycerol polyethylene glycol oxystearate, glycerol polyethylene glycol ricinolate, ethoxylated soybean sterols, ethoxylated castor oils and the hydrogenated derivatives thereof, cholesterol, fatty acids having 12 to 24 carbon atoms or salt thereof, and surfactants that form ordered structures in solution and produce non-Newtonian viscoelastic surface tensions such as sugar based surfactants and protein or glycoprotein surfactants. One preferred type of such surfactant has a sugar or other carbohydrate head group, and a hydrocarbon or fluorocarbon tail group. A large number of sugars are known that can function as head groups, including glucose, sucrose, mannose, lactose, fructose, dextrose, aldose, and the like. The tail group preferably has from 2 to 24 carbon atoms, preferably a fatty acid group (branched or unbranched, saturated or unsaturated) covalently bound to the sugar moiety through an ester bond. A preferred surfactant mixture includes a nonionic surfactant or other surfactant in combination with one or more of the non-Newtonian viscoelastic surfactants.

There is disclosed in Wheatley et al. U.S. Pat. No. 5,352,436, incorporated herein by reference, that suitable surfactants for forming stabilized gas microbubbles comprise a first soluble surfactant and a second dispersible surfactant. Suitable first surfactants include polyoxyethylene fatty acid esters such as polyoxyethylene sorbitan monolaurate, polyoxyethylene sorbitan monostearate, polyoxyethylene sorbitan tristearate, polyoxyethylene sorbitan monooleate, and mixtures thereof. Suitable second surfactants, which are different from the first surfactant, include sorbitan monostearate, sorbitan monooleate, and mixtures thereof.

D'Arrigo U.S. Pat. No. 4,684,479, incorporated herein by reference, discloses surfactant mixtures comprising (a) a member selected from the group consisting of glycerol monoesters of saturated carboxylic acids containing from about 10 to about 18 carbon atoms and aliphatic alcohols containing from about 10 to about 18 carbon atoms; (b) a sterol-aromatic acid ester; (c) a member selected from the group consisting of sterols, terpenes, bile acids and alkali metal salts of bile acids; (d) a member selected from the group consisting of sterol esters of aliphatic acids containing from 1 to about 18 carbon atoms; sterol esters of sugar acids; esters of sugar acids and aliphatic lcohols containing from about 10 to about 18 carbon atoms; esters of sugars and aliphatic acids containing from about 10 to about 18 carbon atoms; sugar acids; saponins; and sapogenins; and (e) a member selected from the group consisting of glycerol, glycerol di- or triesters of aliphatic acids containing from about 10 to about 18 carbon atoms and aliphatic alcohols containing from about 10 to about 18 carbon atoms; said components being present in said mixture in a weight ratio a:b:c:d:e of 2-4:0.5-1.5:0.5-1.5:0-1.5:0-1.5.

The fluorosurfactants include, but are not limited to, (i) fluorinated telomers, (ii) amphoteric fluorosufactants, (iii) polyfluorinated amine oxide, (iv) fluoroalkyl ethylthio polyacrylamides, (v) perfluoroalkyl ethylthiopolyacrylamides, (vi) derivatives of 1-propanaminium, 2-Hydroxy-N,N,N-trimethyl-3-gamma-omega-perfluoro-($C_6$–$C_{20}$-alkyl) thio, chloride, (vii) fluoroalkyl sodium sulfonate, and (viii) sodium salts of 1-propanesulfonic acid, 2-methyl-, 2-{[1-oxo-3[gamma,-omega, -perfluoro-$C_{16}$–$C_{26}$-alkyl) thio}propyl}amino}derivative.

The concentration of aphron-generating surfactant required is generally less than the critical micelle concentration (CMC) of the surfactant or surfactant mixture. An indication of the volume of aphrons generated can be obtained by determining the density reduction which occurs upon generating the aphrons in the fluid. Foaming of the fluid, which is undesirable, can occur if the concentration of aphron-generating surfactant is excessive. We have determined that the concentration of surfactant can be increased, without any adverse effect on the fluid, as the LSRV increases. Thus the concentration of aphron-generating surfactant, which can be determined by routine testing, is the amount required to generate sufficient aphrons to give the density reduction desired but which is, preferably, insufficient to create a long-lasting foam on the surface of the fluid.

The density of the spotting fluids can be adjusted, as required, by the addition of weight materials or the addition of soluble salts to the fluids as is well known in the art. Preferably the weight material is added to the fluid before generation or incorporation of aphrons therein, thus adjusting the final density of the aphron-containing spotting fluid to the desired density by the concentration of aphrons therein.

Additionally, the spotting fluid may contain other functional materials known in the art such as emulsifiers, wetting agents, and the like.

When a drill stem pipe or other downhole tool is stuck against a cake of water-wet well fluid solids on a wall of the wellbore in a permeable formation, and such sticking is believed to be due to differential hydrostatic pressure across the drill stem, the pipe or tool may be released by substantially filling the wellbore outside the drill stem in the permeable formation with the spotting fluid of this invention. The spotting fluid is held to the wellbore in contact with the cake for a period of time sufficient for the fluid to alter and disturb the filter cake in some manner, such as to cause the cake to dehydrate or shrink and crack and for the fluid to penetrate the cake of water-wet well fluid solids. Such flow of the fluid from the wellbore into the cake through the resulting cracks should at least partially relieve or reduce the differential pressure across the drill stem piping or other downhole tool.

The spotting fluid may be held in contact with the cake for an additional time to further shrink, crack and penetrate the cake so that the spotting fluid penetrates entirely through the cake and wets the surface of the permeable formation. Wetting the surface of the permeable formation with the spotting fluid lowers the forces of adhesion between the cake of water-wet solids and the face of the permeable formation so that the cake in contact with the drill stem has a strong tendency to break away from the surface of the formation while it may continue to adhere to the drill stem.

Further holding of the spotting fluid in contact with the cake of water-wet solids will result in the fluid penetrating the permeable formation and establishing a differential pressure gradient from the bore of the well outside the drill stem through the cake and into the formation, thereby further decreasing the differential pressure which forces the drill stem against the cake. In establishing this pressure gradient from the wellbore through the cake into the formation, penetration of the spotting fluid through the cracked cake is not limited to penetration through that portion of the cake against which the drill stem in stuck. Fluid penetrating through the cake at each side of this portion may penetrate freely into the formation and diffuse therein to a location behind the drill stem, setting up a pressure gradient from the bore of the well through the cake and into the formation. This pressure gradient substantially reduces the force with which the drill stem is held against the cake by hydrostatic pressure in the wellbore. Dehydration and cracking of the cake, accompanied by penetration of spotting fluid into the cake, also results in a change in friction between the cake and the drill stem. As a result of some or all of these forces, the drill stem becomes loosened from its lodged or stuck position against the wall of the borehole.

After the spotting fluid has been spotted in the permeable formation, and preferably after such fluid has been held in the wellbore for a length of time sufficient for the fluid to cause the cake to dehydrate or shrink and crack and for the fluid to penetrate the cake, the pipe may be worked by conventional mechanical methods, such as torquing or vibrating, to help break away from the wall of the wellbore.

The time required for the spotting fluid time, to shrink, crack and penetrate the cake cannot be estimated accurately, but frequently may be from several minutes to several hours, depending on the particular well conditions, the composition of the cake, its permeability and other factors.

Any suitable method for placing the spotting fluid in the wellbore in the permeable formation may be used. One preferred method for filling the wellbore in the permeable formation with the spotting fluid of the present invention is to introduce a slug of such fluid into a well fluid circulating system and pump the slug of fluid followed by the mud used in drilling the well down the drill stem and up through the wellbore outside the drill stem to the desired location and stopping circulation when the fluid is in place. This manner of spotting fluids at particular locations in a wellbore is well known in the art.

Without being limited hereby, it is believed that the aphrons present in the spotting fluid effectively seal the formation after release of the stuck pipe or tool thus preventing further pipe sticking.

The following examples are presented to demonstrate the invention but should not be construed as limiting the scope of the invention. The aphron-generating surfactants evaluated are as follows: STEPOSOL™ CA-207, an ammonium alkyl ether sulfate which is 60% active; STEOL™ CS-460, sodium laureth sulfate which is 60% active; and NEODOL™ 25-3, a C12–C15 alcohol 3EO ethoxylate. The aphrons are generated in the fluids of the examples by encapsulating air during mixing of the fluids containing the aphron-generating surfactants. Abbreviations used in the table or this specification are as follows: cp=centipoise; g=grams; bbl=42 gallon barrel; ppg=pounds per gallon; ppb=pounds per barrel; psi=pounds per square inch; rpm—revolutions per minute; STI=shear inning index which is the ratio of the 0.5 rpm Brookfield viscosity and the 100 rpm Brookfield viscosity, a measure of the degree of shear thinning of a fluid; vol.=volume.

EXAMPLE 1

1.5 g of xanthan gum were hydrated in 175 g (0.5 bbl) or water. 0.5 g of aphron-generating surfactant (STEPOSOL™ CA-207) were added while mixing on a 6 speed Hamilton Beach blender set at the lowest speed. To this aphron-containing fluid were slowly added 91.5 g (0.3 bbl) of a mixture of 90 g diesel oil plus 1.5 g oil soluble surfactant (NEODOL™ 25-3). This oil-in-water aphron-containing fluid thus contained 1.875 ppb xanthan gum, 0.625 ppb STEPOSOL™ CA-207, and 1.875 ppb NEODOL™ 25-3, wherein the liquid phase contained 37.5 vol. % diesel oil and 62.5 vol. % water.

EXAMPLE 2

1.5 g xanthan gum were hydrated in 175 g (0.5 bbl) of water. 1.0 g of an aphron-generating surfactant, STEOL™ CS460, were added while mixing on a 6 speed Hamilton Beach mixer set at the lowest speed. To this aphron-containing fluid were slowly added 61 g (0.2 bbl) of a mixture of 60 g diesel oil and 1.0 g NEODOL™ 25-3. This oil-in-water aphron-containing fluid thus contained 2.14 ppb xanthan gum, 1.43 ppb STEOL™ CS-460, and 1.43 ppb NEODOL™ 25-3, wherein the liquid phase contained 28.6 vol. % diesel and 71.4 vol. % water.

EXAMPLE 3

300 g (1.0 bbl) of a low viscosity mineral oil were viscosified with 7.0 g of Cab-O-Sil™ M5 fumed silica. 6.0 g of NEODOL™ 25-3 were added while mixing as in Example 1 followed by 88.5 g (0.25 bbl) of a mixture of 1.25 g of surfactant STEOL™ CS-460 plus 87.25 g of water. The fluid inverted to an extremely viscous oil-in-water fluid. Removed 180 g, designated Sample A. Thereafter 28 g (0.079 bbl) of a mixture containing 0.394 g STEOL™ CS-460 surfactant and 27.606 g water were added to decrease the viscosity. This oil-in-water aphron-containing fluid thus contained 5.025 ppb fimed silica, 4.3 ppb NEODOL™ 25-3 surfactant, and 1.08 ppb STEOL™ CS-460 surfactant wherein the liquid phase contained 72.85 vol. % oil and 27.15 vol. % water.

EXAMPLE 4

174 g of Sample A from Example 3 were mixed with 102 g of a mixture of 1.44 g STEOL™ CS-460 surfactant in 100.56 g of water. Very fluid. Added 2.0 g xanthan gum followed by 37 g of a mixture of 0.52 g STEOL™ CS-460 surfactant in 36.48 g water. This oil-in-water aphron-containing fluid thus contained 3.09 ppb xanthan gum, 3.25 ppb fumed silica, 2.79 ppb NEODOL™ 25-3, and 1.14 ppb STEOL™ CS-460 wherein the liquid phase contained 68.7 vol. % oil and 31.3 vol. % water.

EXAMPLE 5

8.0 grams of CARBO-GEL™ organophilic hectorite were dispersed in 300 g (1 bbl equivalent) of diesel oil with 1 g propylene carbonate dispersant to form a viscous slurry. 2.0 g of STEOL™ CS-460 surfactant were added while mixing in a high speed (shear) blender. Aphrons were incorporated into the viscous fluid from the vortex in the mixer.

EXAMPLE 6

Example 5 was repeated except that 11.0 g of CARBO-GEL™ were used.

The fluids of Examples 1–6 were evaluated for the Brookfield viscosity at 0.5 rpm, which is a measure of the LSRV, and the Brookfield viscosity at 100 rpm. The ratio of the 0.5 rpm viscosity to the 100 rpm viscosity is a measure of the shear thinning characteristics of the fluids. The density of the fluids was also measured and used to calculate the concentration of aphrons in the fluids using the equation:

(Calculated Density−Actual Density)(100)÷(Calculated Density).

The data obtained are set forth in Table A.

TABLE A

| Example | Brookfield Viscosity, cp | | | Density | Calculated Density | Aphrons Vol. |
|---|---|---|---|---|---|---|
| | 0.5 rpm | 100 rpm | STI | ppg | ppg | % |
| 1 | 50,500 | 671 | 72 | 6.57 | 7.99 | 17.8 |
| 2 | 51,000 | 675 | 76 | 5.86 | 8.11 | 27.7 |
| 3 | 510,000 | 4550 | 112 | 6.85 | 7.71 | 11.1 |
| 4 | 230,000 | 4920 | 47 | 6.73 | 8.02 | 16.1 |
| 5 | 47,000 | 369 | 127 | 5.58 | 7.40 | 24.6 |
| 6 | 111,000 | 912 | 122 | 6.51 | 7.47 | 12.9 |

EXAMPLE 7

One barrel equivalent (350 cubic centimeters) of a 12.57 ppg invert oil emulsion drilling fluid having an 80/20 diesel oil water ratio and containing 5.5 ppb CARBO-GEL™, 1 ppb propylene carbonate, 5 ppb CARBO-TEC™ L, 8 ppb CARBO-MUL™, 3 ppb lime, and 229 ppb barite, wherein the aqueous internal phase is 30% by weight calcium chloride solution, was placed in a high shear lab Osterizer mixer and mixed for 5 minutes after adding 2 ppb of a fluorocarbon surfactant (non-ionic fluoroaliphatic polymeric esters) thereto. The density and Brookfield viscosity were then measured. This fluid, which contained about 9.7% aphrons, was then passed through an APV Gaulin™ homogenizer at 1000 psi and the density and viscosities again determined.

The data obtained are set forth in Table B.

TABLE B

| Fluid Homogenized | Brookfield Viscosity | | | | Density | Aphrons |
|---|---|---|---|---|---|---|
| | 0.3 rpm | 0.5 rpm | 100 rpm | STI | ppg | Vol. % |
| No | 23,000 | 15,200 | 215 | 71 | 11.43 | 9.7 |
| Yes | 74,000 | 48,200 | 490 | 98 | 11.52 | 7.5 |

EXAMPLE 8

Fluids having the composition of the fluids of Examples 1, 2, 3, 4, 5, 6, and 7 are used as spotting fluids to free a drill pipe stuck in a wellbore. Sufficient volume of fluid to cover the area where the pipe is stuck to the formation is circulated down the drill pipe to the location of pipe sticking. The circulation is stopped and the spotting fluid is held in the wellbore for a length of time sufficient for the fluid to release the stuck pipe. Periodically the pipe is worked by conventional mechanical methods such as jarring to help the pipe to be released.

What is claimed is:

1. A spotting fluid for use in releasing stuck pipe or tools within a borehole comprising a liquid selected from the group consisting of aqueous liquids, oleaginous liquids, and mixtures thereof, having incorporated therein one or more viscosifiers such that the spotting fluid has a low shear rate viscosity as measured with a Brookfield Viscometer at 0.5 rpm of at least about 10,000 centipoise, an aphron-generating surfactant, and aphrons.

2. The spotting fluid of claim 1 wherein the density of the liquid and the concentration of aphrons are such that the spotting fluid has the desired density.

3. The spotting fluid of claim 1 which contains a continuous aqueous phase having a viscosifier therein.

4. The spotting fluid of claim 1 which contains a continuous oleaginous phase having a viscosifier therein.

5. The spotting fluid of claim 2 which contains a continuous aqueous phase having a viscosifier therein.

6. The spotting fluid of claim 2 which contains a continuous oleaginous phase having a viscosifier therein.

7. The spotting fluid of claim 1, 2, 3, 4, 5, or 6 wherein the low shear rate viscosity is at least about 40,000 centipoise.

8. A method of releasing a stuck pipe or tool within a borehole comprising introducing the spotting fluid of claim 1, 2, 3, 4, 5, or 6 to the depth of the point of the stuck pipe or tool and in a volume sufficient to displace the fluid in the borehole over the entire stuck area, and allowing the spotting fluid to soak for a period of time sufficient to release the stuck pipe or tool.

9. The method of claim 8 wherein the spotting fluid has a low shear rate viscosity of at least about 40,000 centipoise.

* * * * *